United States Patent
Grigoli et al.

(10) Patent No.: US 6,235,329 B1
(45) Date of Patent: May 22, 2001

(54) COMPOSITE ICE-CREAM CONE METHOD

(75) Inventors: Franco Albino Luigi Grigoli; Ivano Maini, both of Milan (IT)

(73) Assignee: S.I.D.A.M. S.R.L., Cormano (IT)

( * ) Notice: Subject to any disclaimer, the term of this patent is extended or adjusted under 35 U.S.C. 154(b) by 0 days.

(21) Appl. No.: 09/540,261

(22) Filed: Mar. 31, 2000

Related U.S. Application Data

(62) Division of application No. 09/267,474, filed on Mar. 11, 1999.

(30) Foreign Application Priority Data

Jun. 1, 1998 (IT) ................................. MI98A1210

(51) Int. Cl.⁷ ................. A23G 9/04; A23P 1/08
(52) U.S. Cl. ............... 426/282; 426/283; 426/390; 426/391; 426/393; 426/410
(58) Field of Search ................ 426/95, 139, 138, 426/391, 390, 100, 101, 93, 94, 282, 283, 393, 410

(56) References Cited

U.S. PATENT DOCUMENTS

| | | | |
|---|---|---|---|
| 1,509,194 | * 9/1924 | Dresser | 426/138 |
| 1,607,664 | * 11/1926 | Carpenter | 426/139 |
| 1,690,984 | * 11/1928 | Lane et al. | 426/139 |
| 1,875,960 | * 9/1932 | Turnbull | 426/139 |
| 1,876,105 | * 9/1932 | Turnbull | 426/139 |
| 1,938,113 | * 12/1933 | Schoenfeld | 426/139 |
| 1,988,392 | * 1/1935 | Niklason | 426/95 |
| 2,135,808 | * 11/1938 | Friedman | 426/95 |
| 2,167,353 | * 7/1939 | Frediani | 426/95 |
| 2,248,448 | * 7/1941 | Chester | 426/139 |
| 2,527,993 | * 10/1950 | Habler | 426/139 |
| 2,649,057 | * 8/1953 | Niklason | 426/95 |
| 2,759,826 | * 8/1956 | Lindsey | 426/95 |
| 4,390,553 | * 6/1983 | Rubenstein et al. | 426/139 |
| 4,427,702 | * 1/1984 | Andrews | 426/139 |
| 4,472,440 | * 9/1984 | Bank | 426/138 |
| 4,600,591 | * 7/1986 | Galli | 426/138 |
| 5,858,428 | * 1/1999 | Truscello et al. | 426/138 |

FOREIGN PATENT DOCUMENTS

| | | | |
|---|---|---|---|
| 416891 | * 9/1934 | (GB) | 426/139 |
| 568385 | * 10/1957 | (IT) | 426/139 |
| 3-240442 | * 10/1991 | (JP) | 426/101 |
| 6-278786 | * 10/1994 | (JP) | 426/138 |

* cited by examiner

*Primary Examiner*—Steven Weinstein
(74) *Attorney, Agent, or Firm*—Notaro & Michalos P.C.

(57) ABSTRACT

A method of making a composite ice-cream cone having a preformed, closed-bottomed wafer shell. The shell has an inner surface, a length, an outer surface, and an upper edge. A separate, preformed, closed-bottomed chocolate shell has a lower portion and an upper portion, and a filling of a frozen product contained in both said lower and upper portions.

2 Claims, 2 Drawing Sheets

COMPOSITE ICE-CREAM CONE METHOD

CROSS REFERENCE TO RELATED APPLICATION

This is divisional of application Ser. No. 09/267,474, filed Mar. 11, 1999.

FIELD AND BACKGROUND OF THE INVENTION

This invention proposes a process for the production of an ice-cream in which the product is contained inside a chocolate shell inserted in its turn into a wafer and in which this chocolate shell extendes along all the inside surface of the wafer and projects for a certain portion upwardly beyond the wafer. The process according to the invention foresees:

the formation of an ice-cream cone already provided with a covering layer;

the insertion of the cone into a wafer; and the wrapping, if any, of the product obtained in this way.

The invention concerns also the product obtained with this process. The problem that the invention proposes to solve is to preserve the quality of the wafer which, in ice-creams produced with the traditional methods, often becomes damp, losing in this way its fragrance.

As it is known, among the different types of industrial ice-cream, a remarkable diffusion was reached by the ice-creams "in cone", in which the product is contained inside a wafer generally having a conic shape, contained into a paper envelope to which a closing lid is applied upwardly.

The production technology foresees the dosage of the liquid product inside the wafer, which becomes wet and loses therefore the characteristics of freshness and fragrance. For this reason, at the present state of the technique, systems were developed which spray a melted chocolate layer in the inner portion of the wafer, so as to realize a covering able to impermeabilize the wafer and avoid that the dampness of the product transfers to the wafer.

The present processes introduce in the machine the wafer to which the final paper covering has been already applied and then spray the melted chocolate also in correspondence with the paper section where the wafer ends, in order to realize a kind of bridge between the paper and the wafer able to avoid the dampness reaching the wafer. This known system solves only partially the problem, both because rather often this covering is not anyway efficacious and it can be found a rather high percentage of products wherein the dampness succeeds in passing into the wafer, and because some types of chocolate can not be sprayed and therefore the covering choice is limited and requiers exclusion of chocolates of a certain high quality.

Another problem which is found with the known processes, comes from the fact that, as the product is dosed inside the wrapping shortly before the closure, it is not yet well frozen when the lid is applied; it takes place in this way that the decoration applied later or the chopped almonds which are dosed on the ice-cream surface are smoothed during the lid positioning, with the chopped almonds which are pushed inside the ice-cream not yet frozen and/or decoration which is scattered and/or deformed.

SUMMARY OF THE INVENTION

To solve this problem, this invention proposes a process which foresees the production of an ice-cream cone covered with chocolate and the following insertion of the ice-cream into the wafer already provided with covering, after the freezing.

Further the chocolate shell can be higher than the wafer, extenting to all the outer surface of the product, which is then finished by applying the decoration and/or the dosage of the chopped almonds after its solidification, without the risk of deformations when the closing lid of the wrapping is applied.

BRIEF DESCRIPTION OF THE DRAWINGS

The present invention will be now described in detail by way of a non limitative example, with reference to the enclosed figures in which.

DESCRIPTION OF THE PREFERRED EMBODIMENT

Figure 1:
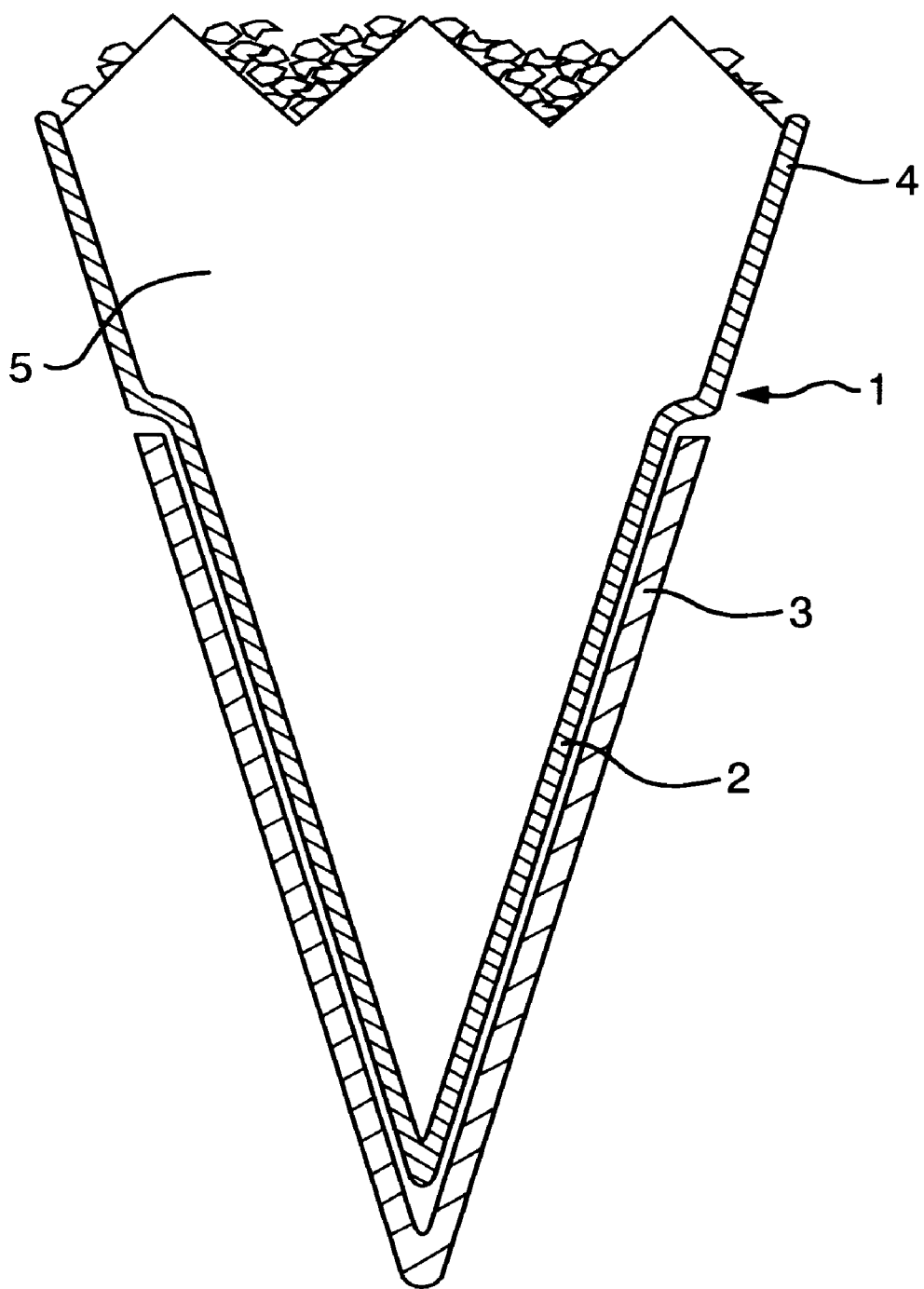
FIG. 1 is a view, in section of an ice-cream produced with the process according to the invention, before the wrapping.
Figure 2:
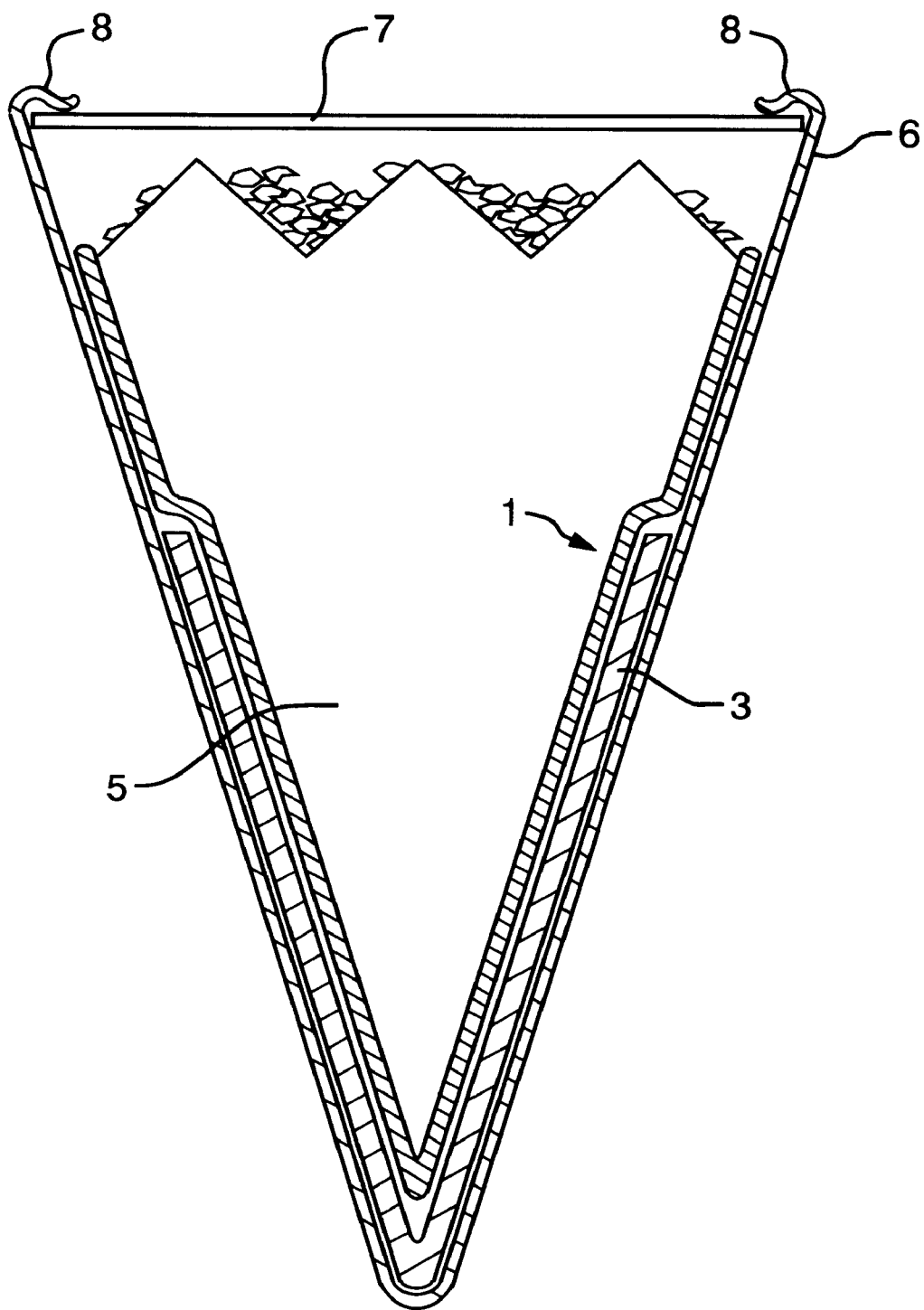
FIG. 2 is the section of a wrapping containing the ice-cream produced with the process according to the invention.

The process according to the invention first an produces ice-cream cone already provided with a covering layer, in particular a cone covered with chocolate and the subsequent insertion, after the chocolate got hard, inside a wafer.

According to a first preferred embodiment, the process comprises the following phases or steps:

the formation of a chocolate shell in a mold which has, at least in one of its parts, a shape similar to the wafer;

the dosage of the product inside this shell;

a the insertion of the shell containing the product in a paper envelope wherein the wafer was positioned;

the finishing, if any, of the ice-cream upper surface, by dosage of chopped almonds and/application of a decoration (a topping);

closure of the wrapping obtained in this way.

In particular the process according to the invention provides at first the production of a chocolate shell 1, which presents a conic part 2 having a form equal to the inner form of the wafer 3 and becomes wider upwardly so as to finish a truncated-conic section which constitutes the ideal extension of the wafer.

It is clear that different arrangements can be adopted, for example the conic part 2 can continue without thickening, even if the form herein shown is preferable because it allows a substantially conic unit and without steps which facilitates the following wrapping.

The shell 1 can be produced with any known method. For example it can be produced by means of a mold-counter-mold system, or filling a mold with hot chocolate and emptying it after a light chocolate, layer is solidified on the surface or spraying the chocolate in the mold.

Once the shell is produced, it is filled inside with a quantity of product 5 constituting the ice-cream.

At the end of the dosage, the unit is frozen until the product is solidified, thereafter the cone, frozen and with the relevant chocolate covering, is inserted into a paper cone 6, into which the wafer 3 was previously positioned.

Before completing the wrapping with a lid 7 held by a turned over upper edge 8 of the paper cone 6, it is possible, if necessary, to finish the product by dosing on the upper surface a certain quantity of chopped almonds or by applying a decoration of liquid chocolate, syrup or other topping.

The described process has different advantages. It is possible to optimize the chocolate covering, employing chocolate of the ideal quality without being limited by the needs to be obliged to apply it by spraying.

The wafer stays crisp without losing its fragrance, since it is not involved in the ice-cream dosing phase. The coupling, in fact, takes place only after the ice-cream was dosed, frozen and covered with chocolate. In these conditions the wafer maintains its own features over time.

A further advantage is relized by the fact that it is possible to obtain a chocolate shell being high up to the decoration and the latter is not ruined in positioning and closing the lid since it is applied to an already solidified product.

For example the wafer can be inserted into the wrapping before positioning the shell with the ice-cream or it can be applied to the shell and therefore the unit inserted into the paper envelope. With a different form of preferred embodiment of the invention, the process provides for:

- the realization of an ice-cream product having the appropriate shape;
- once freezing has occurred, the covering of this cone with a chocolate layer according to known technologies, for example by immersion into liquid chocolate;
- once the solidification of the covering layer has occurred, the insertion of the cone provided with the covering into a wafer.

A skilled person in the art can then foresee, within the limits of the invention several variations.

Both these variations and other possible ones are all considered comprised in the field of this invention.

What is claimed is:

1. A method of making a composite ice-cream cone comprising:

preforming a closed-bottomed wafer shell having an inner surface, a length, an outer surface, and an upper edge;

preforming a separate, closed-bottomed chocolate shell having a lower portion and an upper portion;

insertedly nesting said lower portion of said chocolate shell into said wafer shell with said lower portion having a form complimentary to the inner surface of said wafer shell such that said lower portion extends over both the entire inner surface of said wafer shell and the length of said wafer shell; and before or after the nesting step, filling and freezing a product into both said lower and upper portions of said chocolate shell;

said upper portion of said separate frozen product filled chocolate shell extending above the upper edge of said wafer shell;

said upper portion of said separate frozen product filled chocolate shell having a greater diameter than said lower portion such that the upper portion is in line with the outer surface of said wafer shell.

2. A method according to claim 1, further comprising wrapping a paper wrapping onto said wafer shell and said upper portion of said chocolate shell, and associating a lid with the paper wrapping that extends over said upper portion of said chocolate shell.

* * * * *